United States Patent [19]

Sullivan

[11] Patent Number: 5,075,014
[45] Date of Patent: Dec. 24, 1991

[54] OIL RECOVERY SYSTEM AND APPARATUS

[75] Inventor: Fred M. G. Sullivan, Vancouver, Canada

[73] Assignee: IMC-International Marketing of Canada Corp., Canada

[21] Appl. No.: 519,880

[22] Filed: May 4, 1990

[51] Int. Cl.[5] .......................................... E02B 15/04
[52] U.S. Cl. ..................................... 210/747; 210/776; 210/104; 210/122; 210/242.3; 210/923
[58] Field of Search .................... 210/242.3, 776, 923, 210/104, 415, 86, 122, 739, 747

[56] References Cited

U.S. PATENT DOCUMENTS

| | | | |
|---|---|---|---|
| 625,131 | 5/1899 | Abbott | 210/415 |
| 1,139,033 | 5/1915 | Hebstriet | 210/415 |
| 3,578,171 | 5/1971 | Uyher | 210/923 |
| 3,656,619 | 4/1972 | Ryan et al. | 210/923 |
| 3,722,687 | 3/1973 | Stebbins et al. | 210/923 |
| 3,722,689 | 3/1973 | Markel et al. | 210/923 |
| 3,730,346 | 5/1973 | Previtt | 210/923 |
| 3,810,546 | 5/1974 | Overham | 210/923 |
| 3,831,756 | 8/1974 | Bhuta et al. | 210/923 |
| 3,966,615 | 6/1976 | Petchul et al. | 210/923 |
| 4,024,063 | 5/1977 | Mori | 210/923 |
| 4,378,291 | 3/1983 | Ward et al. | 210/923 |
| 4,469,170 | 9/1984 | Farmer, Jr. | 210/923 |
| 4,818,399 | 4/1989 | Midhiff | 210/923 |
| 4,851,133 | 7/1989 | Rymal | 210/923 |
| 4,867,872 | 9/1989 | Russell et al. | 210/776 |
| 4,935,152 | 6/1990 | Gonzales | 210/923 |

FOREIGN PATENT DOCUMENTS 1388387 4/1988 U.S.S.R. .
2006037 5/1979 United Kingdom .

*Primary Examiner*—Stanley S. Silverman
*Assistant Examiner*—Christopher Upton
*Attorney, Agent, or Firm*—Barrigar & Oyen

[57] ABSTRACT

The present invention provides a self-propelled remote-controlled liquid hydrocarbons recovery or liquid hydrocarbons skimming vehicle (ROV) with an on-board liquid hydrocarbons/water separation apparatus, and a liquid hydrocarbons spill cleanup system incorporating the ROV. The ROV has a gimballed funnel for skimming liquid hydrocarbons from the surface of the water and directing it to a centrifugal separator. The ROV forms part of an oil spill cleanup system which can be deployed by aircraft and remotely operated.

21 Claims, 6 Drawing Sheets

OIL RECOVERY SYSTEM AND APPARATUS

BACKGROUND OF THE INVENTION

The present invention relates to the recovery of liquid hydrocarbons from spills principally in marine environments, rivers or lakes. More particularly, the invention relates to an apparatus for collecting and separating liquid hydrocarbons from water in the event of an oil spill, and a system for employing such apparatus and storing the collected liquid hydrocarbons.

Oil spills cause severe environmental damage. As oil exploration, offshore drilling and oil production and crude oil shipping reach ever increasing magnitudes and ever more sensitive environments, rapid response to oil spills is of increasing importance. Rapid containment and recovery of a spill is critical to minimize environmental damage and cleanup costs. While numerous oil containment and recovery apparatus and systems have been developed, existing systems have insufficient capacity, require too much time to deploy, and are ineffective in adverse weather, rough seas or conditions of limited visibility such as fog or night-time.

A central element of any oil spill cleanup system is an apparatus for "skimming" and separating oil from the water. This is typically done using conventional weir or disc skimmers. However existing skimmers have too little capacity, are too slow and difficult to deploy to be effective particularly for large oil spills, and are limited in the environmental conditions under which they can operate effectively.

SUMMARY OF THE INVENTION

The present invention provides an apparatus for collecting and separating liquid hydrocarbons from the surface of a body of water comprising: a) a housing forming an interior space for receiving a volume of liquid and provided with flotation means, the housing having an entrance aperture adjacent the water surface adapted to admit an uppermost layer of liquid hydrocarbons and water from the water surface to the interior of the housing, and an exit aperture adapted to permit the flow of water from the housing; b) means within the housing for collecting a flow of liquid from the surface layers of the liquid hydrocarbons and water in the interior of the housing and directing the liquid to first pump means; c) means for maintaining said means for collecting at a selected depth; and d) second pump means for evacuating water from said exit aperture. The apparatus may also include an liquid hydrocarbons-water separator mounted in said housing, and connected to means for discharging separated liquid hydrocarbons from the housing to a means for storage of recovered separated liquid hydrocarbons.

The invention further provides a method of collecting liquid hydrocarbons from the surface of water, and separating the liquid hydrocarbons from the water comprising: a) providing a floating liquid hydrocarbons collection and separation apparatus as described above, floating liquid hydrocarbons retention boom means and floating liquid hydrocarbons storage means; b) moving said liquid hydrocarbons boom means to contain the liquid hydrocarbons; c) moving the liquid hydrocarbons collection and separation apparatus into the contained liquid hydrocarbons and operating the apparatus to separate the liquid hydrocarbons from the water; and d) pumping the separated liquid hydrocarbons into the floating liquid hydrocarbons storage means. The liquid hydrocarbons boom means, liquid hydrocarbons collection and separation apparatus and liquid hydrocarbons storage means may be dropped onto the surface of water from the air in one embodiment, or by ship or tractor-trailer.

BRIEF DESCRIPTION OF THE DRAWINGS

Further features of the present invention will become apparent to those skilled in the art to which the present invention relates from reading the following specifications with reference to the accompanying drawings, in which.

DESCRIPTION OF A PREFERRED EMBODIMENT OF THE INVENTION

Figure 1:
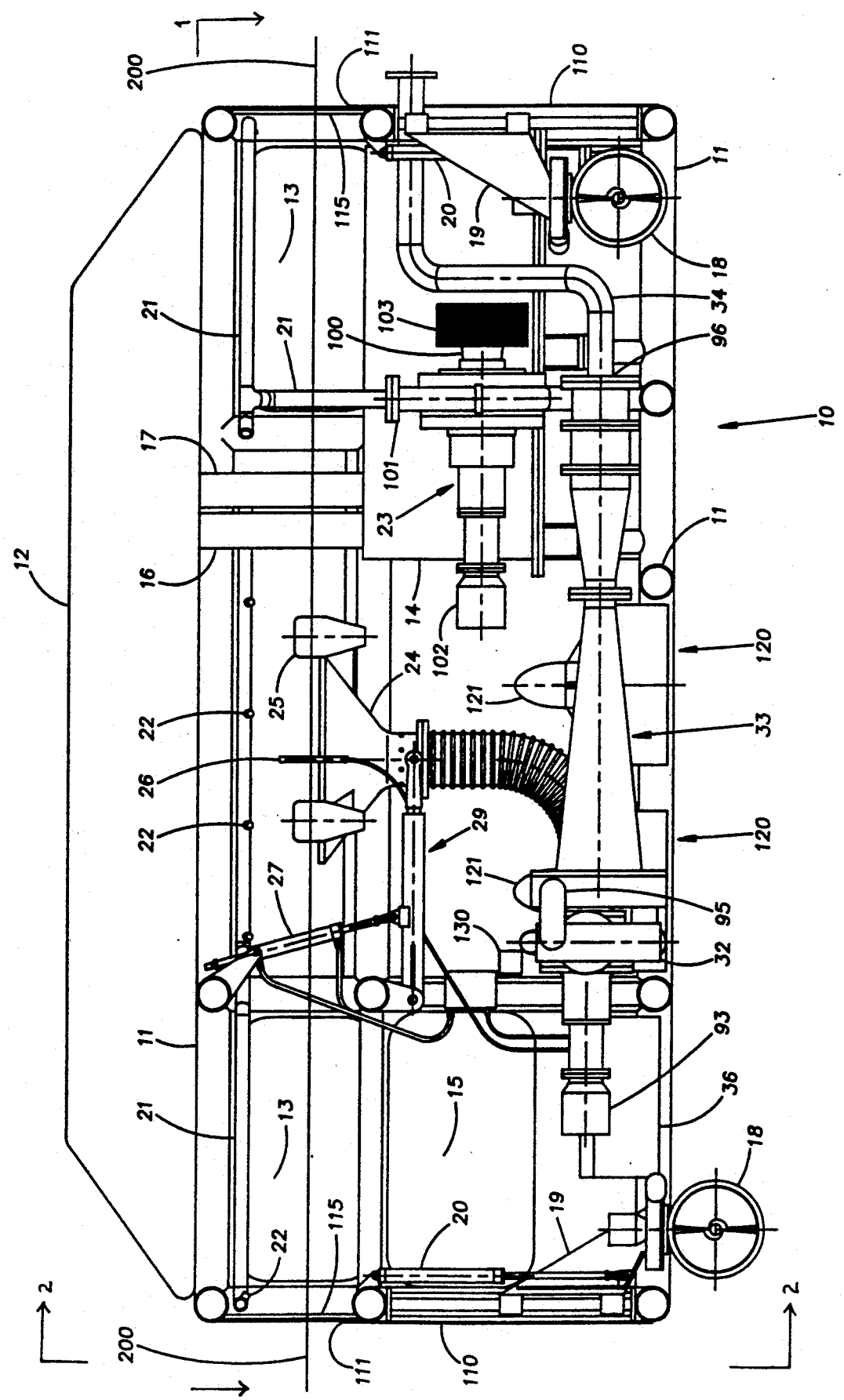
FIG. 1 is an elevation view, in partial section, of the liquid hydrocarbons collection and separation apparatus in accordance with the present invention.

FIGS. 1 through 4 show the overall configuration of the liquid hydrocarbons collection and separation apparatus 10 in accordance with the present invention. The apparatus 10 includes generally a frame 11, a canopy 12, flotation tanks 13, an enclosed power-pack 14, fuel tanks 15, a power-pack breather tube 16, a power-pack exhaust pipe 17, thrusters 18, thruster mounting frames 19, thruster deployment cylinders 20, high-pressure water spray system piping 21, spray funnels 22, high-pressure spray system pump 23, a converging funnel or funnel 24, funnel flotation tanks 25, air/liquid hydrocarbons/water level sensors 26, a funnel depth control cylinder 27, an articulated arm 29, a flexible hose 30, a centrifugal pump 31, separator inlet distribution piping 32, a liquid hydrocarbons/water separator 33, liquid hydrocarbons discharge piping 34, flexible liquid hydrocarbons collection bag 35 (shown in FIG. 6), and enclosed electronics module 36.

While it is contemplated for the preferred embodiment that the power pack 14 is diesel powered, in which case the tanks 15 hold diesel fuel, it is apparent that other sources of power such as gasoline or electricity may be used. In addition, solid polymer fuel cells utilizing cryogenic oxygen and hydrogen as fuel may also be used instead of a diesel powered internal combustion engine. Tanks 15 may be inflatable to preserve the buoyancy of the vehicle. The power pack 14 provides hydraulic power to the various devices. A first thruster 18 has been deployed downwardly into operative position in FIG. 1 on a vertical guide by cylinder 20. It can be rotated horizontally through 360 degrees. A second thruster 18 remains in the recessed position in FIG. Sensors 26 are standard capacitance-measuring level sensors of existing design.

Centrifugal separator 33 is preferably of the type disclosed in U.S. Pat. No. 4,859,347 issued Aug. 22, 1989 to Simon et al.

In the preferred embodiment, frame 11 is a structure, comprised of welded tubing, of a generally box-like nature, to which are attached by mechanical fastener means the flotation tanks 13, the power-pack system elements 14, 16 and 17, the fuel tanks 15, the thruster systems elements 18, 19 and 20, the high-pressure water spray system elements 21, 22 and 23, the liquid hydrocarbons/water collection funnel system elements 24 to 30, the liquid hydrocarbons/water centrifugal pump 31, the liquid hydrocarbons/water separator system elements 32 and 33, the separated-liquid hydrocarbons collection system element 34, and the electronic control module 36.

Figure 2:
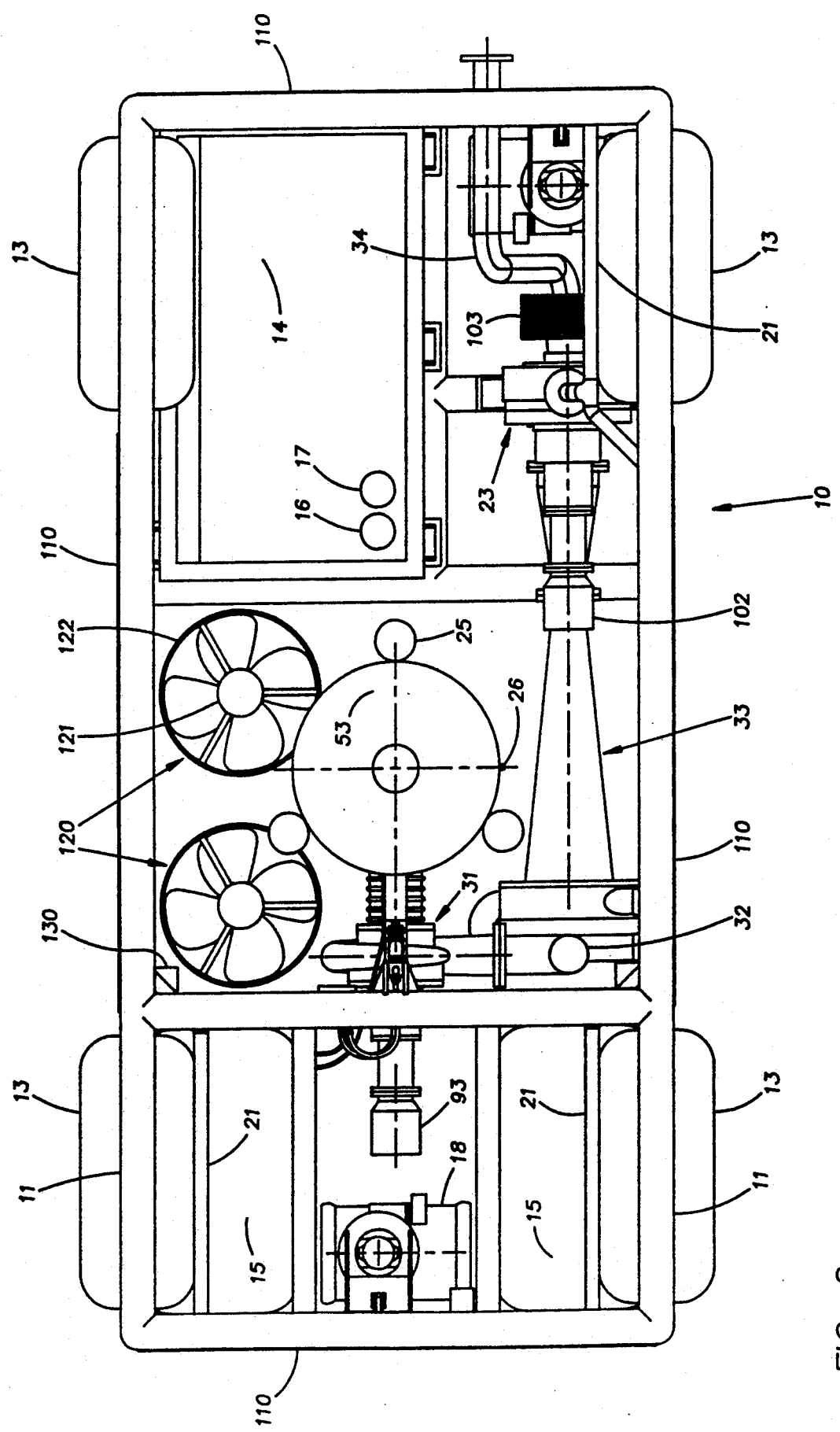
FIG. 2 is a plan view, with the canopy removed, along direction 1—1 of FIG. 1.
Figure 3:
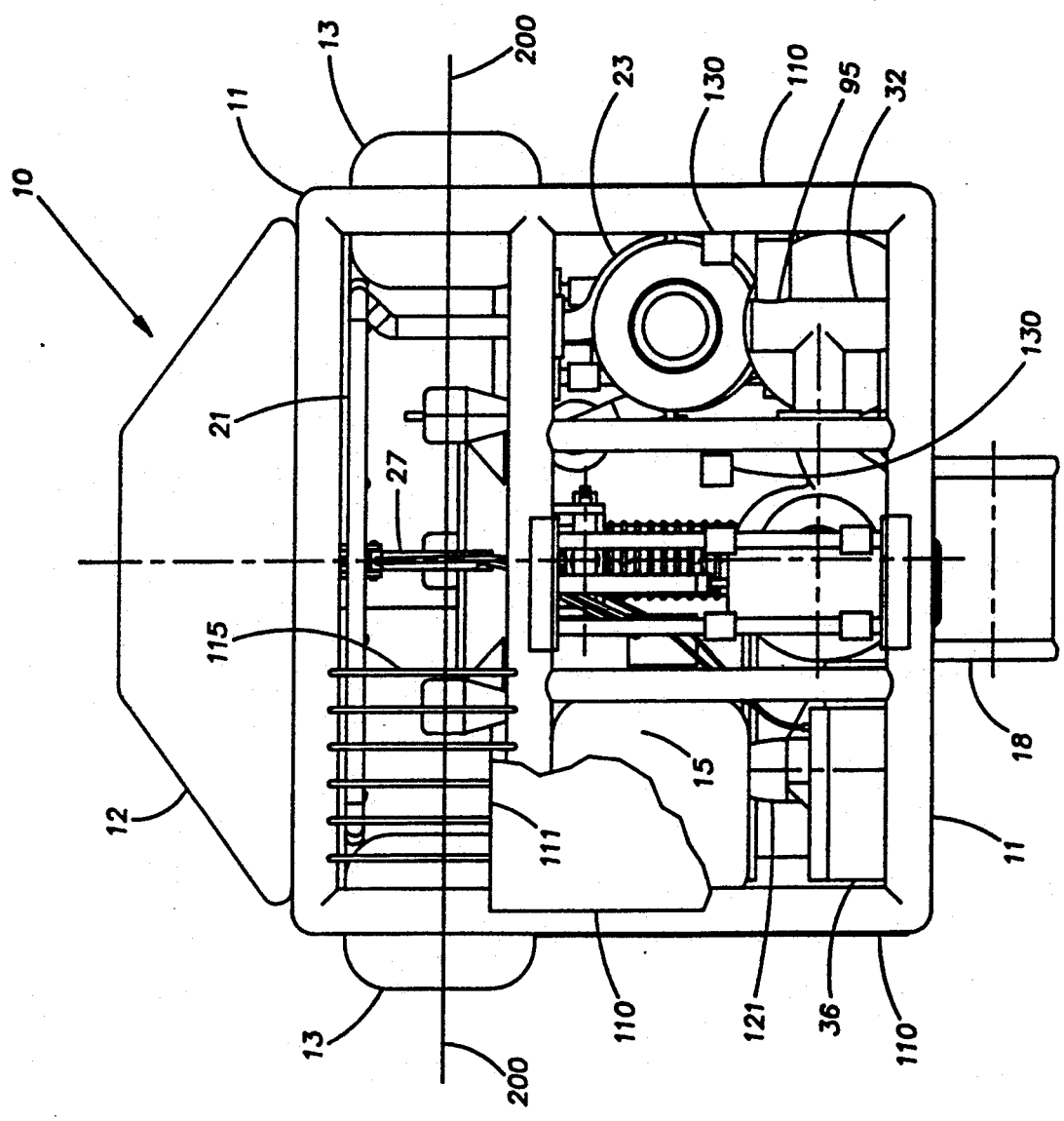
FIG. 3 is an end view, along direction 2—2 of FIG. 1.
Figure 4:
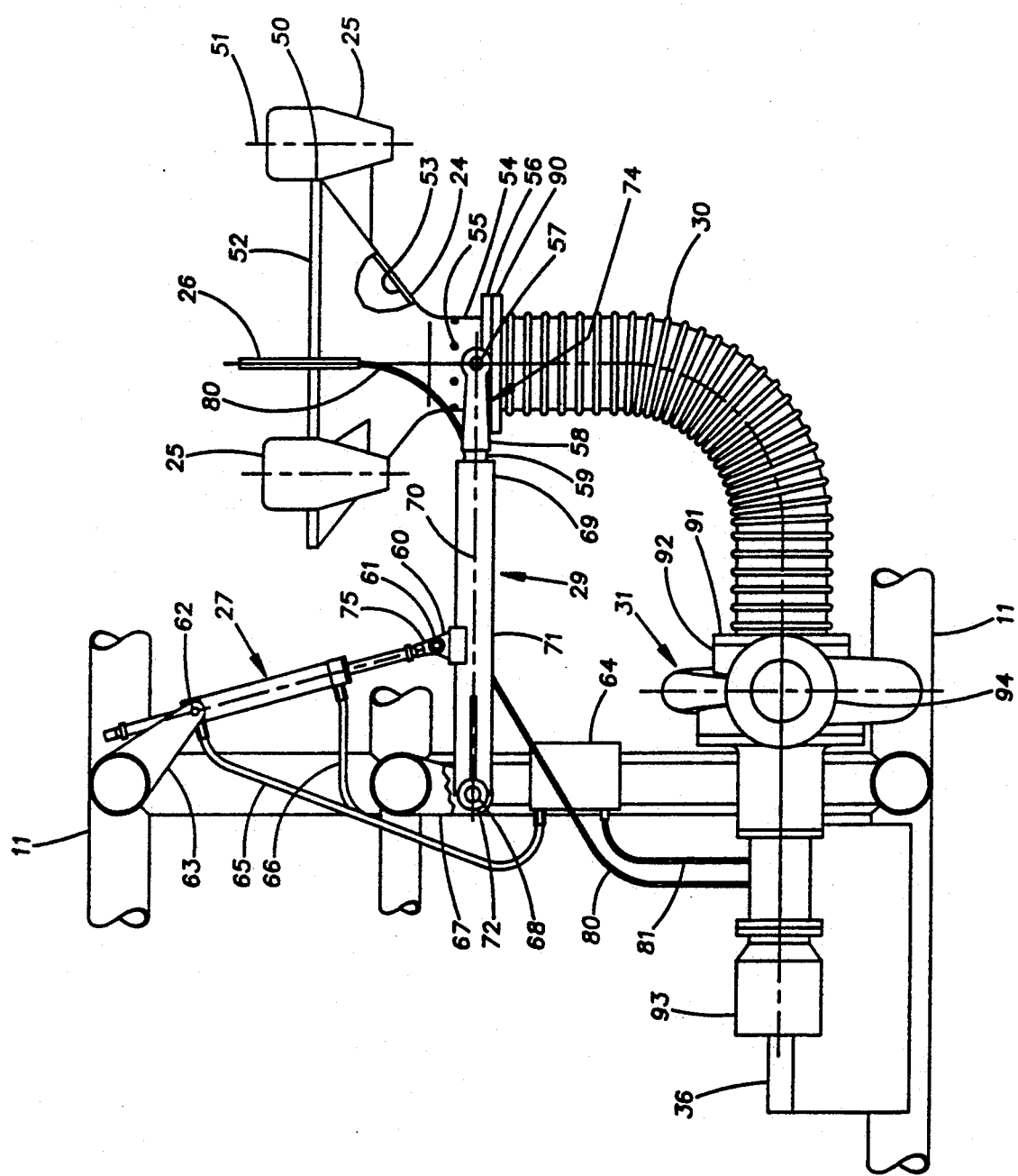
FIG. 4 is a detail elevation view of the inlet funnel and articulated arm with a fuel tank removed and cladding plates partially broken away.

The converging funnel 24 has from three to six (preferably three) flotation tanks 25 attached to its periphery 50, the tanks being spaced generally equally about the periphery with one being placed diametrically opposite the articulated arm 29 as shown in FIG. 2. The flotation tanks 25 are cylindrical, having a vertical axis 51, and are of such radius at the water level 200 that they provide minimal impedance to the flow of liquid hydrocarbons and water over the funnel lip 52. Their purpose is to maintain the plane of the funnel lip 52 parallel to the surface of the water. They have sufficient flotation that they provide sufficient buoyancy to maintain the level of the funnel when the funnel 24 is submerged to its anticipated maximum or minimum depth.

The opening of funnel 24 is preferably covered with a wire mesh 41, with square mesh spacings approximately 10 centimeters across, which acts as a second stage debris barrier. To keep the mesh open, a mesh-cleaning metal bar 43 can be pivotally attached at one point on lip 52 of funnel 24 in order to scrape over the top surface of the mesh in a fashion similar to an automobile windshield wiper. The wiping or sweeping action of the mesh-cleaning bar would be power-operated and would serve to break up agglomerations of highly-viscous oil and force the oil through the mesh into funnel 24. The surface of the mesh-cleaning bar may be coated with a liquid hydrocarbons-inert synthetic material having a low co-efficient of friction.

The funnel 24 is formed of a lip 52 that connects to a conically converging interior surface 53 that in turn connects to the anterior part of a generally cylindrical throat portion 54, which has a series of small holes 55 radially disposed about the central axis of the funnel. Said holes 55 allow, when the apparatus is initially placed in the water, to recover liquid hydrocarbons from a spill, water to flow from the exterior of the funnel 24 to the interior, said water then filling the flexible hose 30 and flooding the suction intake port 92 of the centrifugal pump 31. The holes 55 are sized so that the flow rate of water through the holes is insignificant in comparison with the total flow rates of liquid hydrocarbons and water over the funnel lip 52 when the apparatus of the present invention is in full operation. The posterior part of the throat 54 is connected to a flange 56. Substantially adjacent the flange 56 and extending to the outer diameter of the flange 56 are two "bosses" (not shown), diametrically opposed, at right angles to the center line 70 of the articulated arm 29 and each capable of receiving one end of a pin 57. Vertical baffle plates radiating outwardly from funnel 24 may be positioned submerged or partially submerged below the water level on frame 11 to prevent surface backwash effect in the liquid hydrocarbons.

The articulated arm 29 is comprised of a cylindrical metal tube or shaft 71, a bearing assembly 72 attached to one end of tube 70 such that the centerline of the bearing assembly 72 is at right angles to the center line 70 of the shaft 71, a bearing assembly 69 at the other end of the shaft 71 with the center line of bearing assembly 69 parallel to center line 70, two pins 57, and a U-shaped yoke element 74 comprised of a stub shaft 59 and two arms 58. The stub shaft 59 is affixed to the midpoint of the U-shaped yoke element 74 with the shaft center line lying substantially in the plane defined by the arms 58. The stub shaft 59 extends in a direction opposed to the general direction of the arms 58, and mates with the bearing assembly 69, and is mechanically retained therein, the bearing assembly 69 and stub shaft 59 in combination providing a rotating joint for the articulated arm 29. Means are provided for fixing pins 57 at the ends of the yoke arms 58, said pins mating with the bosses and securing the funnel 24, while allowing the funnel 24 to rotate about the common center line of the pins 57, said common center line being at right angles to the center line of the stub shaft 59. The yoke element 74 therefore provides the two degrees of freedom required to have the funnel gimballed at the end of the articulated arm 29. Two lugs 67 are fixed to the frame 11, each lug 67 having a hole sized to accept one end of a pin 68 with center line in the horizontal plane, said pin passing through the bearing assembly 72, the combination of lugs 67, pin 68 and bearing assembly 72 providing a joint allowing rotation of the articulated arm 29, yoke element 74 and funnel 24 in a vertical plane.

In the preferred embodiment, the said rotation about the center line of the pin 68 is controlled by a hydraulic cylinder 27, the rod end clevis 75 of which is rotatably joined by pivot pin 61 to the eye bracket 60 which is fixed to the tube 71 at a point between the bearing assemblies 72 and 69. Two mounting lugs 63 are fixed to the frame 11, and the hydraulic cylinder 27 is rotatably joined to the lugs 63 by pivot pins 62, in what is termed a "trunnion mount". The center line of the hydraulic cylinder 27 is at a right angle to the center line of the pins 62 and 68.

The entire assembly of funnel 24, yoke element 74, articulated arm 29 and hydraulic cylinder 27 is designed to allow a vertical range of motion for the funnel 24 of greater than sixty centimeters relative to the frame 11, and to allow an angular range of motion for the plane formed by lip 52 of funnel 24 of greater than 25 degrees from the horizontal in any direction.

The package of electronic air/liquid hydrocarbons/water level sensors 26 is fixed to the periphery 50 of the funnel 24, and by means of the electrical cable 80 communicates with the electronic control module 36. Control signals generated by the electronic control module 36 are sent via electrical cable 81 to an electro-hydraulic motor/pump/valving system 64, which communicates with and controls the extension of the hydraulic cylinder 27 by means of hydraulic lines 65 and 66 and thus the depth of funnel 24 relative to the level of the water surface and relative to the oil-water interface level.

The flexible hose 30 has fluid-tight connections, at one end with flange 90, and at the other end with flange 91. The flange 90 is joined by mechanical means to the flange 56, forming a fluid-tight connection, and the flange 91 is joined by mechanical means to the suction port 92 of the centrifugal pump 31, forming a fluid-tight connection. Flexible hose 30 thus forms a fluid passage for transporting spilled liquid hydrocarbons and water from the funnel 24 to the suction port 92. Centrifugal pump 31 is powered by a conventional variable-speed hydraulic motor whose speed is controlled by the oil/water level detection system 26 and control module 36 and may also be controlled by a flow meter installed in line with the pump.

Prior to the suction port 92 of the centrifugal pump there may be a pipe section (not shown) containing a diverter valve (or some mechanical means of diverting solids contained in the intake oil/water mixture) providing two outlet ports in a "Y" configuration, one outlet port connecting to the centrifugal pump and the other outlet port to a debris collection or holding chamber (not shown) which connects to a debris grinding chamber (not shown) containing two mechanical grinders with cutting blades of the preferred type known by the trade name "DWS 3000 Channel", or other similar conventional grinders. The diverting and grinding mechanisms are activated when excessive debris (e.g. kelp, eel grass, bark or other floating debris) is encountered in the oil/water intake mixture which has passed through the primary and secondary debris barriers, that is, the external vertical debris bars 115 located on the four inlet areas, and the protective mesh covering the opening of funnel 124. The grinding chamber outlet port is connected by pressure- and fluid-tight means to a booster pump and conventional filter system, and then connects back to the main centrifugal pump 31. The diverter vlve may be operated manually or automatically by the electronic control module 36 from signals received from a conventional solids detection device.

The centrifugal pump 31 is fixed by mechanical means to the frame 11. The discharge port 94 of the centrifugal pump 31 is joined by mechanical means to the oil/water centrifugal separator inlet distribution piping 32, forming a fluid- and pressure-tight connection, said piping 32 being in fluid communication with the inlet ports 95 of the oil/water centrifugal separator 33, which is fixed by mechanical means to the frame 11. Piping or tubing 34 is connected by fluid- and pressure-tight means to the liquid hydrocarbons discharge port 96 of the liquid hydrocarbons/water separator 33, and is in fluid- and pressure-tight communication with a floating, inflatable oil collection and storage tank 35 (shown in FIG. 5).

A high pressure water spray pump 23 is fixed by mechanical means to the frame 11. Said pump 23 is operable by means of the action of the hydraulic motor 102, the source of water for the pump 23 being the environment. The water enters the pump 23 through the hydraulic pump suction port screen 103 and suction port 100. Piping 21 is connected by pressure- and fluid-tight means to the discharge port 101 of the pump 23 and by mechanical means to the frame 11. A multiplicity of removable spray nozzles 22 are installed along the piping 21 by fluid- and pressure-tight means, said nozzles 22 being arranged to each spray a fan-shaped jet of high-pressure water toward the center of the oil/water intake funnel 24, from an elevation of about 10 inches above the design water line 200 and at an angle of about 25 to 35 degrees to the water surface, sufficient nozzles being installed to cause the fan-shaped sprays to overlap prior to impact at the water surface.

A canopy 12, comprised of sheet and tube members in a generally dome-shaped configuration, the lower edge of which in close proximity to and approximating the outline of the frame 11, is attached to the frame 11 by mechanical means, and provides protection from large waves for the components of the apparatus. The canopy also serves the function of reducing excess water from entering the oil/water intake funnel 24 in rough seas or when a large wave breaks over the apparatus.

In the preferred embodiment of the present invention, the frame 11 is generally covered by removable cladding plate members 110 which together act as a hull, the plates extending over the external portions of the frame bottom and a portion of the sides, the side plates 110 having a maximum upper vertical edge 111 at the four oil/water inlet areas several centimeters below the design water line 200. The hull cladding plates 110 are installed in a manner to allow the extension of the thruster systems, items 18 to 20, below the lowest portion of the frame 11 to the operating position of the thrusters. All of the connections between the frame 11 and plates 110 are fluid-tight, said plates being removable by bolts or the like for the purposes of inspection and maintenance of the apparatus 10.

An opening 122 in the bottom of the hull, bottom plate 110 allows for two water extraction pumps 120, operable by means of the action of a hydraulic motor 121, to discharge water from the volume enclosed by the frame 11 and hull plates 110 to the environment at large. The ultimate source of the water to be discharged is the environment at large external to the apparatus, said water flowing into the enclosed volume of the frame 11 in the areas between the water line 200 and the top edges 111 of the side cladding plates 110 through four main entry areas, one on each side of the apparatus between flotation tanks 13, and at either end of the apparatus. Where the upper edges 11 are formed on separate plates, the height of edges 111 can be manually adjusted and secured using bolts or the like. Thus the total cross-sectional area of the four external oil/water entry areas can be manually adjusted to the optimum level depending on the type of floating liquid hydrocarbons, flotation height of the apparatus, magnitude and condition of the oil spill, etc.

An enclosed, fluid and pressure-tight electronics module 36 contains the electronic hardware and software for operating the systems of the apparatus 10 in a coordinated manner to achieve the efficient and expeditious operation of the apparatus 10 in recovering spilled liquid hydrocarbons and other likewise immiscible substances from the water surface.

METHOD OF OPERATION

When the apparatus 10 of the present invention is in full operation, rotation of the impeller of the centrifugal pump 31 by the action of the hydraulic motor 93 causes the liquid hydrocarbons and water present at the suction port 92 to be moved through the pump and discharged through the discharge port 94 of the centrifugal pump 31. The combination of low pressure created at the suction port 92 and gravity causes water and liquid hydrocarbons, if present in the funnel 24 and flexible hose 30, to flow toward the suction port 92. When the funnel 24 is submerged so that the funnel lip 52 is below the liquid hydrocarbons/water interface level, both liquid hydrocarbons and water flow over the lip 52 through the wire mesh and down the funnel surface 53 toward the funnel throat 54, and thence through the flexible hose 30 toward the suction port 92.

Due to the nature of wave action, the water surface within a circle circumscribing the flotation tanks 25 is rarely a plane surface and usually has an average slope inclined to the horizontal. The average depth of the funnel lip below the water surface is controlled in continuous fashion by the action of the hydraulic cylinder 27, in turn controlled by the action of the electro-hydraulic motor/pump/valving package 64, in turn controlled by the action of the systems in the electronics module 36, which receives its data signals from the air/liquid hydrocarbons/water level sensor package 26 mounted on the periphery 50 of the funnel 24. The gimballed action of the yoke element 74 at the end of the articulated arm 29, in combination with the flotation tanks 25, provides a means whereby the inclination of the surface defined by the generally circular lip 52 of the funnel 24 will continuously follow the approximate average contour of the water surface near the funnel 24.

The liquid hydrocarbons and water discharged through the discharge port 94 of the centrifugal pump 31 passes into the separator inlet distribution piping 32, and thence into the separator 33 via the inlet ports 95. The separator acts to separate the liquid hydrocarbons and water, the water being discharged to the environment at large through the water extraction pumps 120, and the liquid hydrocarbons being conducted by means of piping 34 to the flexible oil storage tank 35.

The high pressure water spray system, items 21 to 23 and 100 to 102, provides a means whereby the flow of floating liquid hydrocarbons may be accelerated and concentrated for recovery at the funnel 24. The action of the fan-shaped water jets impinging, at an angle directed toward the funnel 24, on the oil or other liquid hydrocarbons floating on water surface 200 causes an acceleration of the flow of oil toward the funnel 24, said oil being replaced by oil from the surrounding environment (the oil tends to spread out over the water surface to areas of thinner oil cover. In addition, the flow of water in the jets causes an induced air flow to generally follow the water jets, said air flow aiding in causing the induced flow of liquid hydrocarbons over the water surface toward the funnel 24. The high pressure water jet system may be activated or de-activated automatically by the electronic control module 36 which receives the corresponding command signal from the oil/water level sensor 26 or by radio-transmitted signals from a helicopter, boom boat or support ship (described further below).

The operation of the water exhaust pumps 120 causes water from the surrounding environment to flow into the volume enclosed by the frame 11, over the edge 111 of hull cladding plates 110 at each of the four external oil/water inlet areas. The presence of the cladding plates 110 forming the hull of the vessel restricts the inflowing water to the several centimeters below the water line 200 and above the upper edge 111 of cladding plates 110. The flow of water across the four inlet areas over the edges 111 induces the flow of additional liquid hydrocarbons from the surrounding environment toward the funnel 24. Both this system and the high pressure spray system are intended to increase the efficiency of the apparatus and increase the rate of liquid hydrocarbons recovery. Vertically-mounted debris barrier grid bars 115, spaced approximately 15 to 20 centimeters apart, prevent large floating debris from nearing the funnel 24. Funnel 24 is further provided with the afore-mentioned screen or mesh to prevent debris from entering and clogging the centrifugal pump 31 or centrifugal separator 33. Cutting knives may also be provided in the flow of tube 30 adjacent pump 31 to mulch or pulverize algae, kelp or eel grass which may threaten to clog the pump 31 or separator 33. A double grinder debris processing system of the type sold under the trade-mark DWS 3000 CHANNEL is preferred for this purpose. An obstacle detection sonar package 130, known as a multiple transducer eco-sounder obstacle avoidance system, preferably using 8 to 12 transducers located around the hull of the vehicle, is also provided to allow the device to avoid colliding with large underwater obstacles, reefs, rocks, sand bars, ocean floor etc.

Figure 5:
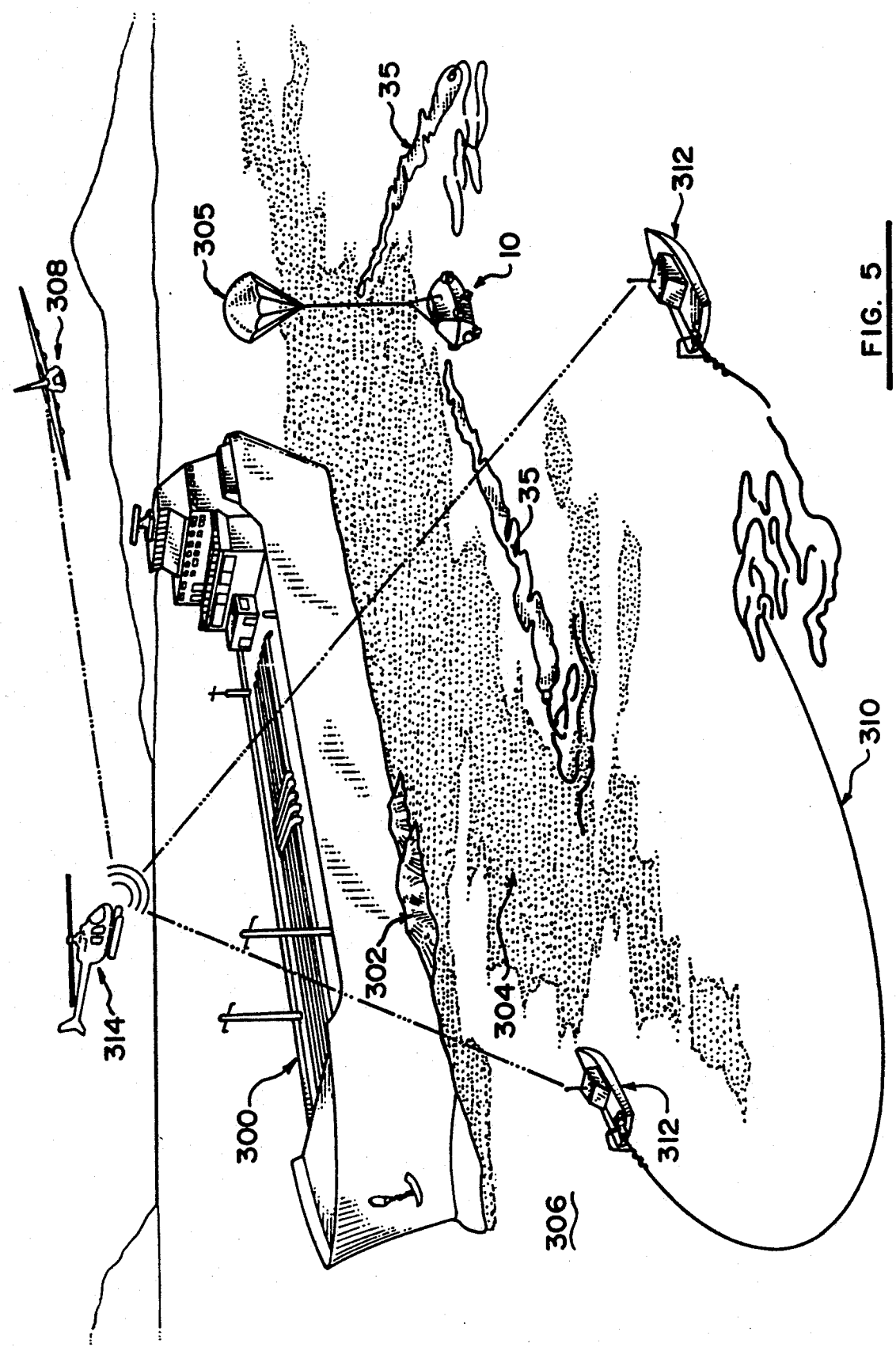
FIG. 5 is a perspective view of a first liquid hydrocarbons spill recovery system incorporating an airplane-deployable version of the apparatus of the present invention in operation in the early stages of a typical oil spill cleanup operation.
Figure 6:
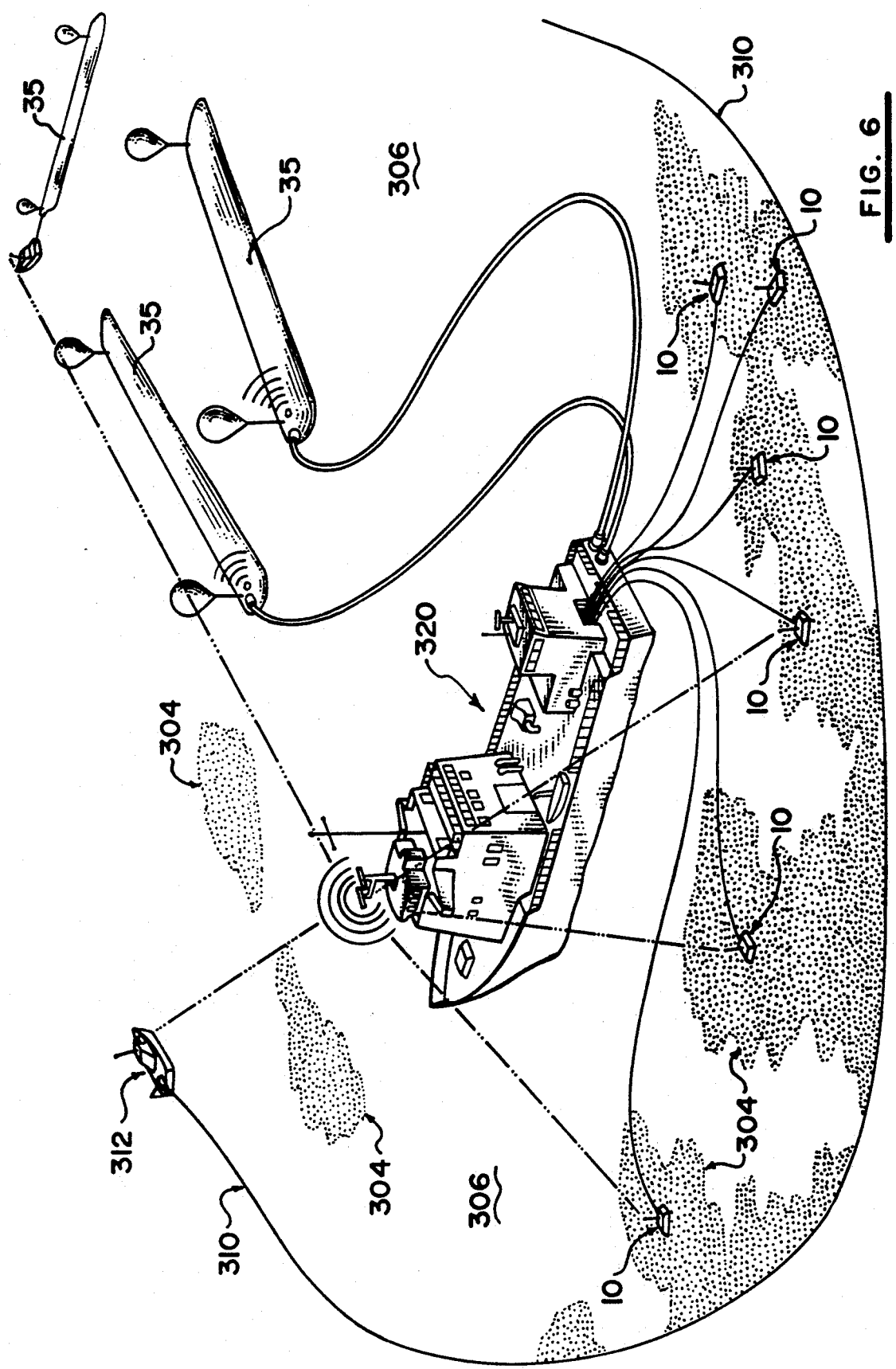
FIG. 6 is a perspective view of a second oil spill recovery system incorporating a number of the apparatus of the present invention in operation at a later stage of a large oil spill cleanup operation.

FIG. 5 and 6 illustrate two airborne oil spill containment and recovery systems utilizing the liquid hydrocarbons recovery apparatus of the invention. In FIG. 5, an oil tanker 300 is shown as having run aground on rocks 302 and is disgorging crude oil slick 304 on the surface of a body of water 306. One or more military cargo aircraft 308, preferably the LOCKHEED HERCULES C-130B aircraft, are used to deploy in flight the various components of the system which, in the case of low-level precision drops, are pulled out of the tail ramp of the aircraft by means of a drag parachute. In the event of severe weather conditions, night-time or poor visibility, each airborne deployable component of the system would be dropped from much greater height (over 300 meters) by means of appropriate conventional drop parachutes. Self-inflating conventional oil spill containment booms 310, such as those sold under the trade-mark ZOOOM BOOM and/or 3M FIRE BOOM, are deployed from aircraft 308 using parachutes and roll-on, roll-off ejection systems. High-impact-resistant "boom boats" 312 are also deployed using parachutes. Weighing roughly 4 to 6 tons each, the boom boats 312 are designed to withstand high-speed impact with the surface of the water. In the one system, the boom boats are operated by crew members lowered into the boat by helicopter 314. In a second system, the boom boats are operated by remote control to robotically hook up to the containment booms 310, and tow them into the desired positions at a safe distance from tanker 300 or from the shore. The self-propelled, remote-controlled oil spill recovery vehicle (ROV) 10 of the invention is also airborne deployable using parachute 305. The cargo aircraft 308 may also be equipped with a roll-on roll-off oil spill dispersant delivery or spraying system such as that sold under the trademark ADDSPAC of Beigert Aviation or similar systems of Conair Aviation or Aerounion Inc. The air-borne-deployable boom boats 312 may be of a design similar to boat known as "oil spill skimming vessels". Such boats may be equipped with water jet propulsion systems of the type sold under the trademark SCHOTTEL.

A conventional hydrocarbon remote sensing system such as that of MacDonald Dettwiler sold under the trademark MEIS may be installed on helicopter 314 and can be used interfaced with a conventional dynamic positioning system to control the remote control boom boats 312 and liquid hydrocarbons recovery vehicle 10. Helicopter 314 may also be used for deployment of an approved oil spill ignition and in situ burning system such as that sold under the trademark HELI-TORCH. The helicopter may also be used to deploy an approved oil spill dispersant (or hydrocarbon emulsifier) spraying system such as that sold by CONAIR AVIATION. Helicopter 314 is used also for directing the low-level precision air drops and for delivery of crews to boom boats 312. Helicopter 314 may also be equipped with a remote-controlled self-righting overboard survivor rescue system such as that sold under the trademark JET NET or similar system. An airborne hydrocarbon remote sensing system is disclosed for example in U.S. Pat. No. 3,899,213 issued Aug. 12, 1975 to the U.S. Department of Transportation. The remote control features of the system disclosed herein allow it to be deployed in adverse conditions which would be inaccessible using manned crews, as well as permitting full operation in conditions of limited visibility, fog, nighttime, etc.

An airborne-deployable liquid hydrocarbons storage device 35 consists of a floating expandable flexible storage tank constructed of inter-polymer ethylene alloys. One airborne system would consist of several airborne-deployable storage tanks which would preferably have a combined capacity on the order of 450,000 gallons (10,000 barrels). In the system shown in FIG. 5, the liquid hydrocarbons recovery vehicles 10 supply recovered liquid hydrocarbons directly to the storage tanks 35, and again in the preferred system the navigation and hook-up is achieved either manually by crew or by remote control as previously described.

In the system shown in FIG. 6, a support ship 320 controls the remote operation of the liquid hydrocarbons recovery vehicles 10, boom boats 312, and booms 310, all of which have been air dropped. In this system, in addition to the primary oil/water separation in each oil recovery ROV, support ship 320 is also equipped with a conventional water purification system to purify the separated water before returning it to the environment. The recovered, separated oil is transferred from large oil holding tanks on board ship 320 by conventional high-volume "in-line" centrifugal oil pumps of the type sold under the trademarks SULZER BINGHAM or BYRON JACKSON to floating tanks 35.

In the ship-mounted version of the invention the oil recovery ROV vehicles 10 are attached to the support/processing ship by floating flexible conventional high-pressure oil hoses. Each recovery vehicle has sufficient hose to reach in any direction up to approximately 250 m. The recovery ROV's are deployed from the ship by an overhead conventional hanging rail system and mechanical-hydraulic cranes preferably of the "gantry" type. The hose for each oil recovery ROV is deployed by a vertically-mounted, hydraulically-operated drum in such a manner that the flow of oil is uninterrupted as the ROV is propelled to or from the ship. The drum automatically maintains a preset recoil tension on the hose to minimize slack or excess hose between the ship and the oil recovery ROV 10.

The system herein described can be operated in a mode similar to the firehall response to a fire alarm. The airborne elements of the system are kept on alert at an airport convenient to the oil tanker coastal shipping lane. The system can thus be deployed faster than existing systems and in conditions which do not allow the deployment /operation of known systems.

As will be apparent to those skilled in the art, various modifications and adaptations of the structure above described may be made without departing from the spirit of the invention, the scope of which is to be construed in accordance with the accompanying claims.

I claim:

1. Apparatus for collecting and separating liquid hydrocarbons from the surface of a body of water comprising:
   a) a housing having side walls and a bottom forming an interior space for receiving a volume of liquid and provided with floatation means, said housing having an entrance aperture whereby in operation said aperture is adapted to admit an uppermost layer of liquid hydrocarbons and water from said surface of said body of water to the interior of said housing, and an exit aperture adapted to permit the flow of water from said housing at a location spaced downwardly from said entrance aperture, said volume of liquid in the interior of said housing forming a second liquid surface;
   b) a liquid hydrocarbons/water separator mounted in said housing;
   c) first pump means for pumping a liquid hydrocarbons/water mixture to said separator;
   d) means within said housing for collecting a flow of liquid hydrocarbons/water mixture from said second liquid surface in the interior of said housing and directing said liquid hydrocarbons/water mixture to said first pump means, wherein said means for collecting comprises a basin opening upwardly and having an upper lip disposed in a generally horizontal plane;
   e) means for adjustably maintaining said means for collecting at a selected depth relative to said second liquid surface; and
   f) water evacuation means for evacuating water from said exit aperture.

2. The apparatus of claim 1 wherein said means for maintaining said collecting means at said depth comprises flotation means secured to said collection means.

3. The apparatus of claim 2 wherein said means for maintaining said collecting means at said depth comprises a plurality of flotation means secured adjacent said upper lip of said collecting means.

4. The apparatus of claim 3 wherein said means for maintaining said collecting means at said depth further comprises an arm pivotally mounted in said housing at a first end thereof and pivotally connected at the other end thereof to said collecting means.

5. The apparatus of claim 4 wherein said connection between said arm and said collecting means is a universal connection.

6. The apparatus of claim 4 wherein said means for maintaining said collecting means at said depth further comprises power means for moving said arm.

7. The apparatus of claim 6 wherein said means for maintaining said collecting means at said depth further comprises control means for controlling the operation of said power means, and means for sensing the levels of water or liquid hydrocarbons adjacent said second liquid surface, generating one or more signals indicative of said levels and conveying said signals to said control means.

8. The apparatus of claim 1 further comprising motive means for moving said housing in the water.

9. The apparatus of claim 8 wherein said motive means are remotely operated.

10. The apparatus of claim 1 further comprising spray means for directing a spray of water at said second liquid surface in the interior of said housing to move a portion of said liquid towards said collecting means, and means for providing a supply of water under pressure to said spray means.

11. The apparatus of claim 1 further comprising means for adjusting the level of said entrance aperture in relation to said water surface.

12. The apparatus of claim 1 wherein said separator comprises a centrifugal separator.

13. The apparatus of claim 1 further comprising first debris screening means arranged to cover said entrance aperture.

14. The apparatus of claim 13 further comprising second debris screening means arranged to cover said upward opening of said basin.

15. The apparatus of claim 14 wherein said second debris screening means further comprises automatic screen sweeping means for maintaining said second debris screening means free from debris.

16. The apparatus of claim 1 wherein said entrance aperture extends around all sides of said housing.

17. The apparatus of claim 1 wherein said upper lip of said basin is adapted to pivot freely about perpendicular axes lying in the generally horizontal plane.

18. A method of collecting liquid hydrocarbons from a surface of water, and separating said liquid hydrocarbons from said water comprising:
 a) providing a liquid hydrocarbons collection and separation apparatus, floating liquid hydrocarbons retention boom means and floating liquid hydrocarbons storage means;
 b) moving said liquid hydrocarbons boom means to contain said liquid hydrocarbons;
 c) moving said liquid hydrocarbons collection and separation apparatus into said contained liquid hydrocarbons and operating said apparatus to separate said liquid hydrocarbons from said water; and
 d) pumping said separated liquid hydrocarbons into said floating liquid hydrocarbons storage means;
wherein said liquid hydrocarbons collection and separation apparatus comprises:
 e) a housing having side walls and a bottom forming an interior space for receiving a volume of liquid and provided with floatation means, said housing having an entrance aperture whereby in operation said aperture is adapted to admit an uppermost layer of liquid hydrocarbons and water from said surface of said body of water to the interior of said housing, and an exit aperture adapted to permit the flow of water from said housing at a location spaced downwardly from said entrance aperture, said volume of liquid in the interior of said housing forming a second liquid surface;
 f) a liquid hydrocarbons/water separator mounted in said housing;
 g) first pump means for pumping a liquid hydrocarbons/water mixture to said separator;
 h) means within said housing for collecting a flow of liquid hydrocarbons/water mixture from said second liquid surface in the interior of said housing and directing said liquid hydrocarbons/water mixture to said first pump means, wherein said means for collecting comprises a basin opening upwardly and having an upper lip disposed in a generally horizontal plane;
 i) means for adjustably maintaining said means for collecting at a selected depth relative to said second liquid surface; and
 j) water evacuation means for evacuating water from said exit aperture.

19. The method of claim 18 wherein said liquid hydrocarbons boom means, liquid hydrocarbons collection and separation apparatus and liquid hydrocarbons storage means are dropped onto said surface of water from the air.

20. The method of claim 19 further comprising the step of locating said floating liquid hydrocarbons by means of remote hydrocarbon sensing means prior to providing said liquid hydrocarbons collection and separation apparatus, floating liquid hydrocarbons retention boom means and floating liquid hydrocarbons storage means at said location of said floating hydrocarbons.

21. The method of claim 20 wherein said liquid hydrocarbons collection and separation apparatus further comprises remotely controlled propulsion means.

* * * * *